(12) United States Patent
Kuehner et al.

(10) Patent No.: US 12,735,046 B2
(45) Date of Patent: Sep. 15, 2026

(54) SYSTEMS AND METHODS FOR MODIFYING LATERAL VEHICLE DYNAMICS TO INCREASE OPERATOR VIGILANCE

(71) Applicant: Woven by Toyota, Inc., Tokyo (JP)

(72) Inventors: Manuel Ludwig Kuehner, Mountain View, CA (US); Xabier Carrera Akutain, Brussels (BE); Hiroshi Yasuda, San Francisco, CA (US)

(73) Assignee: Woven by Toyota, Inc., Tokyo (JP)

( * ) Notice: Subject to any disclaimer, the term of this patent is extended or adjusted under 35 U.S.C. 154(b) by 199 days.

(21) Appl. No.: 18/095,206

(22) Filed: Jan. 10, 2023

(65) Prior Publication Data

US 2024/0227816 A1 Jul. 11, 2024

(51) Int. Cl.
*B60W 40/08* (2012.01)
*B60W 10/20* (2006.01)

(52) U.S. Cl.
CPC ........... *B60W 40/08* (2013.01); *B60W 10/20* (2013.01); *B60W 2540/229* (2020.02)

(58) Field of Classification Search
CPC . B60W 40/08; B60W 10/20; B60W 2540/229
See application file for complete search history.

(56) References Cited

U.S. PATENT DOCUMENTS 8,942,892 B2 1/2015 Veen et al.
9,463,805 B2 10/2016 Kirsch et al.
9,794,323 B2 10/2017 Tsimhoni et al.
9,798,323 B2 10/2017 Tsimhoni et al.
9,815,388 B1 11/2017 Lindsay
10,082,791 B2 9/2018 Bertollini et al.
10,095,228 B1 10/2018 Kuffner et al.
10,160,484 B2 12/2018 Lee et al.
10,252,729 B1 4/2019 Goldman-Shenhar
10,399,576 B2 9/2019 Suzuki et al.
10,421,465 B1 * 9/2019 Jutkowitz ........... B60W 10/184
10,528,837 B1 1/2020 Krishnan
10,597,044 B2 3/2020 Suzuki et al.
(Continued)

FOREIGN PATENT DOCUMENTS

CN 105320128 A 2/2016
CN 113352958 A 9/2021
(Continued)

OTHER PUBLICATIONS

U.S. Appl. No. 17/709,672, filed Mar. 31, 2022.
(Continued)

*Primary Examiner* — Toya Pettiegrew
(74) *Attorney, Agent, or Firm* — Christopher G. Darrow; Darrow Mustafa PC

(57) ABSTRACT

System, methods, and other embodiments described herein relate to enhancing operator vigilance without causing an adverse reaction. In one embodiment, a method includes receiving a disengagement likelihood; operating a steering system controlling one or more wheels based on a steering signal; selecting a stimulus pattern that if executed causes the steering system to deviate the one or more wheels from the steering signal; and executing the stimulus pattern if the disengagement likelihood is above a first threshold.

20 Claims, 8 Drawing Sheets

(56) References Cited

U.S. PATENT DOCUMENTS 10,647,237 B2 5/2020 Song
10,653,350 B2 5/2020 Takemoto et al.
10,703,267 B2 7/2020 Iwasaki et al.
10,744,906 B2 8/2020 Sugioka et al.
10,759,436 B2 9/2020 Fung et al.
10,890,909 B2 1/2021 Flynn et al.
11,077,863 B2 8/2021 Nemec et al.
11,142,205 B2 10/2021 Hilnbrand et al.
11,173,836 B2 11/2021 Oesterwind et al.
11,300,954 B2 4/2022 Goldman-Shenhar
11,420,651 B2 8/2022 Kirk et al.
2005/0110348 A1 5/2005 Hijikata et al.
2013/0253767 A1* 9/2013 Lee ....................... B60W 50/04 701/41
2014/0365073 A1 12/2014 Stanek et al.
2015/0138361 A1 5/2015 Tatsukawa
2016/0187879 A1 6/2016 Mere et al.
2017/0016483 A1 1/2017 Sakagami
2018/0065549 A1* 3/2018 Watanabe ................ B60Q 9/00
2019/0011942 A1 1/2019 Hsieh et al.
2019/0111944 A1 4/2019 Nagahashi et al.
2020/0216079 A1* 7/2020 Mahajan ........... B60W 60/0051
2020/0233426 A1* 7/2020 Johnson ............... G05D 1/0061
2020/0298798 A1 9/2020 Yamamoto et al.
2020/0362808 A1 11/2020 Cosgrove et al.
2020/0406934 A1 12/2020 Krause
2021/0061312 A1* 3/2021 Wang ................ B60W 60/0015
2021/0162919 A1* 6/2021 Oesterwind .......... B62D 15/025
2021/0309221 A1 10/2021 Alpert et al.
2022/0089086 A1 3/2022 Burmistrov et al.
2022/0161811 A1 5/2022 Lu et al.
2022/0176991 A1 6/2022 Kuehner
2022/0379690 A1 12/2022 Kuehner
2023/0026400 A1* 1/2023 Kuehner ................ B62D 6/008

FOREIGN PATENT DOCUMENTS

DE 102018005421 A1 1/2020
EP 3000651 B1 2/2018
EP 3296151 A1 12/2019
GB 2535246 A 8/2016
JP 2001256598 A 9/2001
JP 3239727 B2 12/2001
JP 3429727 B2 7/2003
JP 2004290499 A 10/2004
JP 2006194633 A 7/2006
JP 5794971 B2 10/2015
JP 2015230573 A 12/2015
JP 2018111392 A 7/2018
JP 2018167623 A 11/2018
JP 2018206111 A 12/2018
JP 6743714 B2 8/2020
JP 6936107 B2 9/2021
WO 2020205629 A1 10/2020

OTHER PUBLICATIONS

Sarker et al. "A Review of Sensing and Communication, Human Factors, and Controller Aspects for Information-Aware Connected and Automated Vehicles", IEEE Transactions on Intelligent Transportation Systems, vol. 21 Issue 1, 2019. 24 pages.

* cited by examiner

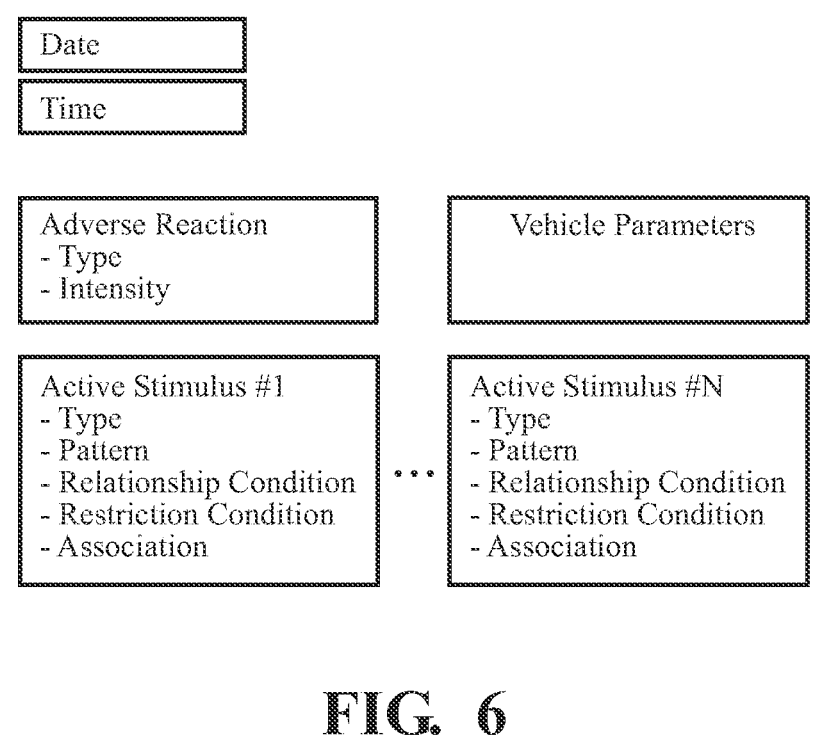

Date

Time

Adverse Reaction
- Type
- Intensity

Vehicle Parameters

Active Stimulus #1
- Type
- Pattern
- Relationship Condition
- Restriction Condition
- Association

• • •

Active Stimulus #N
- Type
- Pattern
- Relationship Condition
- Restriction Condition
- Association

FIG. 6

SYSTEMS AND METHODS FOR MODIFYING LATERAL VEHICLE DYNAMICS TO INCREASE OPERATOR VIGILANCE

CROSS-REFERENCE TO RELATED APPLICATIONS

This application claims benefit of U.S. Non-Provisional application Ser. No. 18/095,286, filed on Jan. 10, 2023, which is herein incorporated by reference in its entirety.

TECHNICAL FIELD

The subject matter described herein relates, in general, to operator vigilance, and, more particularly, to enhancing operator vigilance through use of a lateral vehicle dynamics stimulus.

BACKGROUND

Vehicles may be equipped with systems or methods for measuring operator vigilance. For example, a driver monitoring system may determine if a driver is fatigued or otherwise lacking sufficient vigilance for a desired task. In particular, when a disengagement event occurs necessitating takeover from autonomous mode, a driver monitoring system may seek to provoke a driver into a higher state of operator vigilance sufficient to resume manual driving. Generally, such provocations look for a desired response indicating such a higher state of operator vigilance, such as the driver taking hold of the steering wheel, the driver's eyes looking out on the road, or the driver moving to a more upright driving position. Further, a lack of a reaction is often taken as a negative indication of operator vigilance necessitating further provocation.

SUMMARY

In one embodiment, example systems and methods relate to a manner of enhancing operator vigilance using a lateral vehicle dynamics stimulus are disclosed.

In one embodiment, a vigilance enhancement system for a vehicle is disclosed. The vigilance enhancement system includes one or more processors, and a memory communicably coupled to the one or more processors. The memory stores instructions that when executed by the one or more processors cause the one or more processors to receive a disengagement likelihood; operate a steering system controlling one or more wheels based on a steering signal; select a stimulus pattern that if executed causes the steering system to deviate the one or more wheels from the steering signal; and execute the stimulus pattern if the disengagement likelihood is above a first threshold.

In one embodiment, a non-transitory computer-readable medium for enhancing operator vigilance and including instructions that when executed by one or more processors cause the one or more processors to perform one or more functions is disclosed. The instructions include instructions to receive a disengagement likelihood; operate a steering system controlling one or more wheels based on a steering signal; select a stimulus pattern that if executed causes the steering system to deviate the one or more wheels from the steering signal; and execute the stimulus pattern if the disengagement likelihood is above a first threshold.

In one embodiment, a method for enhancing operator vigilance is disclosed. In one embodiment, the method includes receiving a disengagement likelihood; operating a steering system controlling one or more wheels based on a steering signal; selecting a stimulus pattern that if executed causes the steering system to deviate the one or more wheels from the steering signal; and executing the stimulus pattern if the disengagement likelihood is above a first threshold.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6 illustrates one embodiment of a user engagement event record.

DETAILED DESCRIPTION

Systems, methods, and other embodiments associated with enhancing user vigilance are disclosed herein. Prior to a disengagement event, it may be desirable to enhance operator vigilance prior to the issuance of a takeover request. However, it is also desirable that the enhancement of operator vigilance prior to a takeover request is less provocative than what may occur after a takeover request. For example, provocations to raise operator vigilance upon a disengagement notification are intentionally obtrusive so as to ensure that a driver is in a proper mental and physical state to takeover driving the vehicle. Given that prior to a disengagement notification, using such obtrusive provocations may act to annoy a driver, systems and methods are disclosed herein regarding subtler stimuli that may act to enhance operator vigilance without requiring driver monitoring systems or causing adverse reactions (e.g., a driver's undesired reaction to such an enhancement stimulus).

In particular, a lateral vehicle dynamics stimulus is described in which stimulus patterns may affect the operation of one or more wheels relative to a baseline steering signal, which may cause subtle vibrations to a vehicle's occupants. Further, the stimulus pattern's intensity, frequency, or other characteristics may increase as the likelihood of a potential disengagement event increases. In addition, through superposition of vibrational waves created by one or more stimulus patterns, a particular location within a vehicle may targeted.

Figure 1:
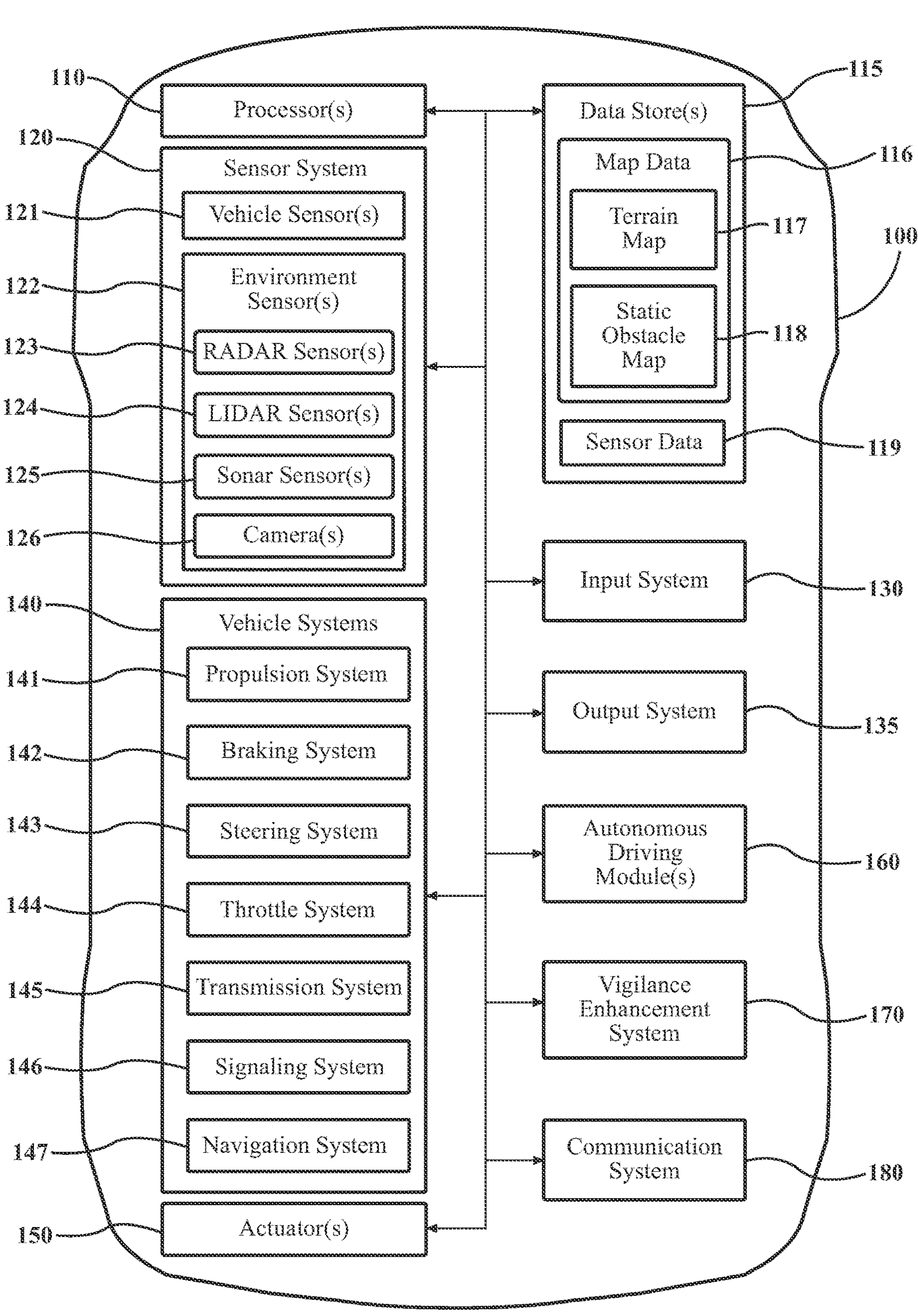
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with using stimulus patterns to enhance user vigilance. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a vigilance enhancement system 170 that is implemented to perform methods and other functions as disclosed herein relating to enhancing user vigilance via stimulus patterns executed by enhancement stimulus module 225. As will be discussed in greater detail subsequently, the vigilance enhancement system 170, in various embodiments, is implemented partially within the vehicle 100, and as a cloud-based service. For example, in one approach, functionality associated with at least one module of the vigilance enhancement system 170 is implemented within the vehicle 100 while further functionality is implemented within a cloud-based computing system.

Figure 2:
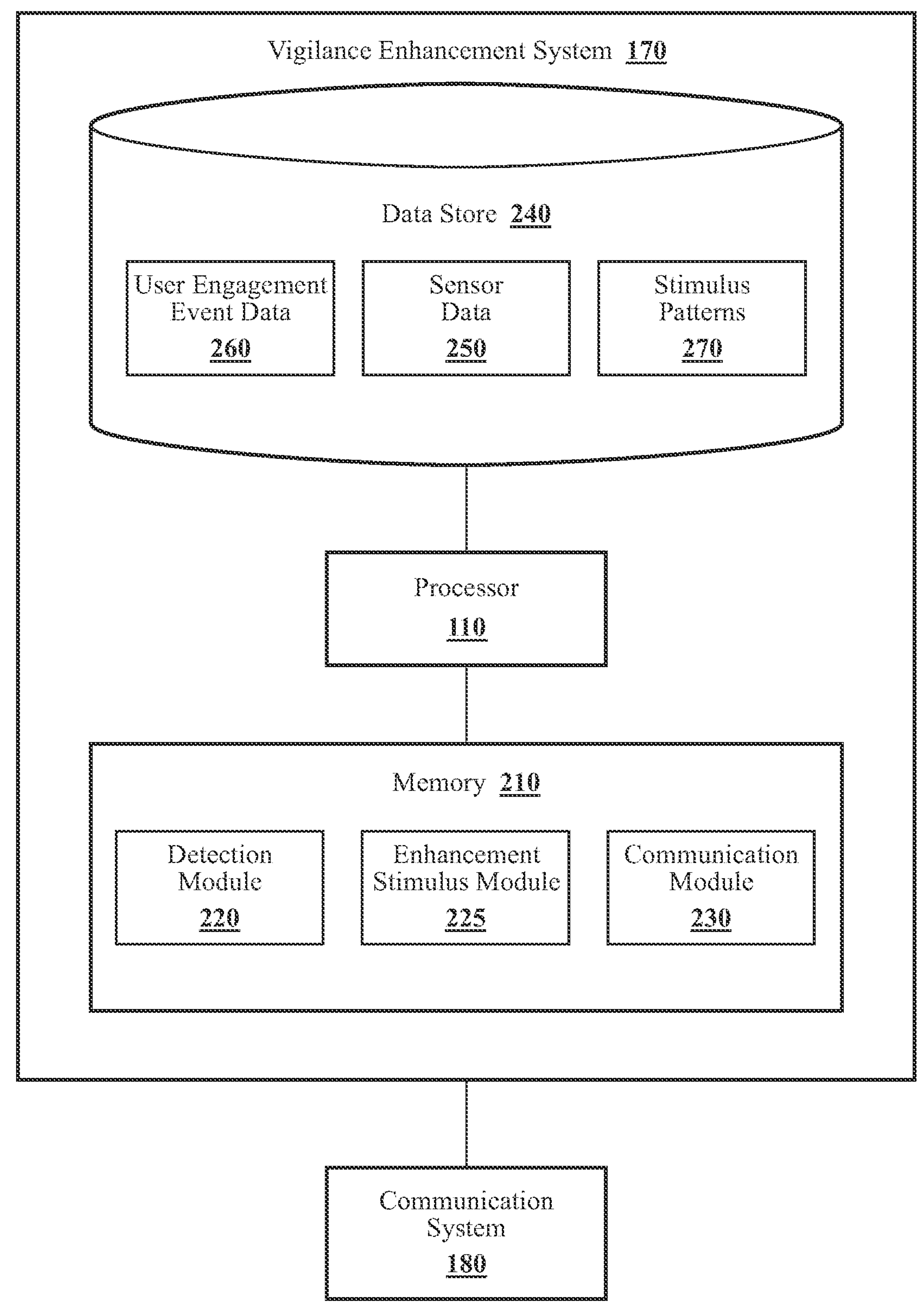
FIG. 2 illustrates one embodiment of a user vigilance system that is associated with using stimulus patterns to enhance operator vigilance.

With reference to FIG. 2, one embodiment of the vigilance enhancement system 170 of FIG. 1 is further illustrated. The vigilance enhancement system 170 is shown as including a processor 110 from the vehicle 100 of FIG. 1. Accordingly, the processor 110 may be a part of the vigilance enhancement system 170, the vigilance enhancement system 170 may include a separate processor from the processor 110 of the vehicle 100, or the vigilance enhancement system 170 may access the processor 110 through a data bus or another communication path. In one embodiment, the vigilance enhancement system 170 includes a memory 210 that stores a detection module 220, an enhancement stimulus module 225, and a communication module 230. The memory 210 is a random-access memory (RAM), read-only memory (ROM), a hard-disk drive, a flash memory, or other suitable memory for storing the modules 220, 225, and 230. The modules 220, 225, and 230 are, for example, computer-readable instructions that when executed by the processor 110 cause the processor 110 to perform the various functions disclosed herein. The vigilance enhancement system 170 as illustrated in FIG. 2 is generally an abstracted form of the vigilance enhancement system 170 as may be implemented between the vehicle 100 and a cloud-computing environment.

With reference to FIG. 2, the detection module 220 generally includes instructions that function to control the processor 110 to receive data inputs from one or more sensors of the vehicle 100. The inputs are, in one embodiment, observations of one or more objects in an environment proximate to the vehicle 100 or other aspects about the surroundings. As provided for herein, the detection module 220, in one embodiment, acquires sensor data 250 that includes at least camera images. In further arrangements, the detection module 220 acquires the sensor data 250 from further sensors such as a radar 123, a LiDAR 124, and other sensors as may be suitable for identifying vehicles and locations of the vehicles. In some arrangements, the detection module 220 acquires the sensor data 250 from further sensors such as weight sensors, movement sensors, grip sensors, force sensors, driver monitoring systems. EEG systems, capacitive sensors, and other sensors as may be suitable for observing the behavior of occupants within a vehicle.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 or from sensor data acquired over a wireless communication link (e.g., v2v) from one or more of the surrounding vehicles. Thus, the sensor data 250, in one embodiment, represents a combination of perceptions acquired from multiple sensors.

In addition to locations of surrounding vehicles, the sensor data 250 may also include, for example, information about lane markings, and so on. Moreover, the detection module 220, in one embodiment, controls the sensors to acquire the sensor data 250 about an area that encompasses 360 degrees about the vehicle 100 in order to provide a comprehensive assessment of the surrounding environment. Of course, in alternative embodiments, the detection module 220 may acquire the sensor data about a forward direction alone when, for example, the vehicle 100 is not equipped with further sensors to include additional regions about the vehicle or the additional regions are not scanned due to other reasons (e.g., unnecessary due to known current conditions).

Moreover, in one embodiment, the vigilance enhancement system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220, 225, and 230 in executing various functions. In one embodiment, the database 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the database 240 further includes user engagement event data 260 and stimulus patterns 270 as described herein.

The detection module 220, in one embodiment, is further configured to perform additional tasks beyond controlling the respective sensors to acquire and provide the sensor data 250. For example, the detection module 220 may include instructions that cause the processor 110 to determine if an adverse reaction defining a user engagement event has occurred.

An adverse reaction may include any detectable action by an occupant of a vehicle that may be interpreted as a response to an enhancement stimulus (e.g., a lateral vehicle dynamics stimulus provided via a stimulus pattern being executed by an enhancement stimulus module on a steering system as described herein). For example, an adverse reaction may include an occupant interacting with a steering wheel, an interactive screen, gas or brake pedals, seat controls, dashboard controls, or any other vehicle user interface in response to an enhancement stimulus. In some embodiments, the finding of an adverse reaction may require that a relationship condition, such as one that may be specified in a stimulus pattern, be satisfied between the enhancement stimulus and a user response. For example, the relationship condition may be that the response is an action by the user affecting the operation of the enhancement stimulus, such as turning off or otherwise adjusting the magnitude, modulation, location, or other user-controllable characteristics of a vehicle system in order to affect the operation of an active enhancement stimulus. In some embodiments, the finding of an adverse reaction may also require satisfaction of time-based restrictions, such as that the user response occurred within a time frame associated with a change in the enhancement stimulus made by enhancement stimulus module 225. In some embodiments, a finding of an adverse reaction may also require that a user response occur within a time frame prior to a disengagement warning or takeover request.

In some embodiments, the detection module 220 may also include instructions that cause the processor 110 to determine positive or negative associations for a user engagement event record based on the adverse reaction and the enhancement stimuli in effect. For example, if an occupant grabs the steering wheel while a lateral vehicle dynamics stimulus is being applied, a positive association with respect to the lateral vehicle dynamics stimulus may be recorded along with the adverse reaction in the user engagement event record.

As another example, a vehicle occupant may be subject to multiple enhancement stimuli (e.g., based on temperature, vibration, and seat position adjustments) but only acts to turn off massage. In such a situation, the detection module 220 may record in a user engagement event record that a positive association exists between the adverse reaction and the massage-based enhancement stimulus, but that one or more negative associations exists between the adverse reaction and the temperature-based and seat-position-based enhancement stimuli. Further, in some embodiments, the values of the negative or positive associations recorded in a user engagement event record may depend on the type of adverse reaction, the magnitude of the adverse reaction, or other measurements giving an indication of the strength of the adverse reaction detected.

For example, if a user response is to gently engage the steering wheel in response to a first enhancement stimulus as opposed to suddenly grasping the steering wheel with intense force in response to a second enhancement stimulus, then different values for indicating positive associations between the first and second enhancement stimuli may be implemented (e.g., that the positive association with the first enhancement stimulus has a smaller magnitude than the positive association with the second enhancement stimulus). As another example, when a vehicle occupant displays a high level of sensitivity to a particular enhancement stimulus (e.g., frequently having an adverse reaction to massage-based enhancement stimulus), a higher positive association may be assigned even if the user response is mild (e.g., merely turning off the massage-based stimulus) due to the occupant's higher-than-usual frequency of adverse reactions arising from massage-based stimulus. In some embodiments, a specific value (e.g., "0") may be used with respect to the negative or positive association to indicate a lack of a relationship between an enhancement stimulus and an adverse reaction.

In some embodiments, the detection module 220 may also include information in a user engagement event record associated with an adverse reaction, such as for each active enhancement stimulus: the stimulus pattern(s) in use; the type of stimulus (e.g., massage, seat temperature); the time since the last adjustment of the enhancement stimulus; the nature of the last adjustment of the enhancement stimulus; any restriction conditions as described below affecting the stimulus; the termination or not of the enhancement stimulus' or any adjustment of the enhancement stimulus subsequent to the adverse reaction. In addition, the user engagement event record may further contain additional context relating to vehicle performance or its environment, such as recent changes in a likelihood of disengagement, occurrence of actual disengagement, vehicle speed or location, etc.

In one embodiment, the enhancement stimulus module 225 generally includes instructions that function to control the processor 110 or collection of processors in the cloud-computing environment 300 to receive one or more stimulus patterns 270 for implementing enhancement stimuli, such as a lateral vehicle dynamics stimulus. Stimulus patterns 270 may contain information that when executed causes enhancement stimulus module 225 to alter one or more characteristics of a system under the control of vehicle systems 140 (e.g., a seat massage system, a seat temperature system, a cabin temperature system, seat position/incline system, seat massage system, a window transparency system, a cabin audio system, a window positioning system).

Moreover, the adjustments made by enhancement stimulus module 225 may vary in proportion to an estimate of a disengagement likelihood as described herein.

With respect to a stimulus pattern affecting the steering system 143, such a stimulus pattern when executed by the enhancement module 225 may cause one or more wheels to deviate from a baseline steering signal. For example, the baseline steering signal may indicate that all wheels should continue straight down the road, while a lateral vehicle dynamics stimulus pattern contains instructions that both front wheels should oscillate left and right according to a sinusoidal pattern having a specified magnitude and frequency (and where one or both such parameters are dependent on vehicle speed). In a further example, the sinusoidal function of the stimulus pattern may also be applied to the rear wheels as well. In some embodiments, a lateral vehicle dynamics stimulus may turn on or off steering functions or otherwise alter the characteristics of steering functions (e.g., decoupling the steering wheel from stimulus patterns applied to wheels controlled by the steering system). Further, a relationship condition for determining an adverse reaction to a stimulus pattern affecting a steering system may be that the response detected must involve a user requested change to the operation of the steering system.

A lateral vehicle dynamics stimulus pattern may be represented by periodic waveforms (e.g., sinusoidal, sawtooth, square wave), where such waveforms may by defined by a magnitude, frequency, time, or other variables. The stimulus pattern may also be represented by random functions, aperiodic waveforms, Fourier transforms, or other techniques known in the art for representing functions or waveforms. In some embodiments stimulus patterns may affect all wheels to be adjusted the same, while in other embodiments they may be inverted (e.g., right wheel(s) perform the opposite deviation of the left wheel(s), front wheel(s) perform the opposite deviation of the rear wheel(s)). In some embodiments, a stimulus pattern may pose a different set of instructions for the deviations to performed on each wheel the stimulus pattern affects.

In some embodiments, a stimulus pattern may contain information modifying the execution of the stimulus pattern by the enhancement stimulus module 225, such as a duration to perform the stimulus pattern upon being triggered; a duty cycle for turning on and off the stimulus pattern within a period of time (e.g., 50%); or restriction conditions on the use of the stimulus pattern, such as vehicle occupant; vehicle speed, vehicle location, road surface types, local weather environment; or other conditions that must be satisfied before the stimulus pattern may be used. For example, some stimulus patterns may only be used with specific vehicle occupants; below or above certain vehicle speeds; at the start or end of a journey; in locations of particular concern or interest (e.g., schools, construction zones, parking lots, driveways); on specific road surfaces (e.g., only gravel); on dry roads only; in snow conditions only; and so on. In this manner, the use of restrictive conditions in the stimulus patterns may be used to enhance the awareness of the driver by providing a subtle suggestion related to a particular experience (e.g., arriving home, driving through a school zone, current weather conditions) only when such restriction conditions are satisfied.

Figure 8:
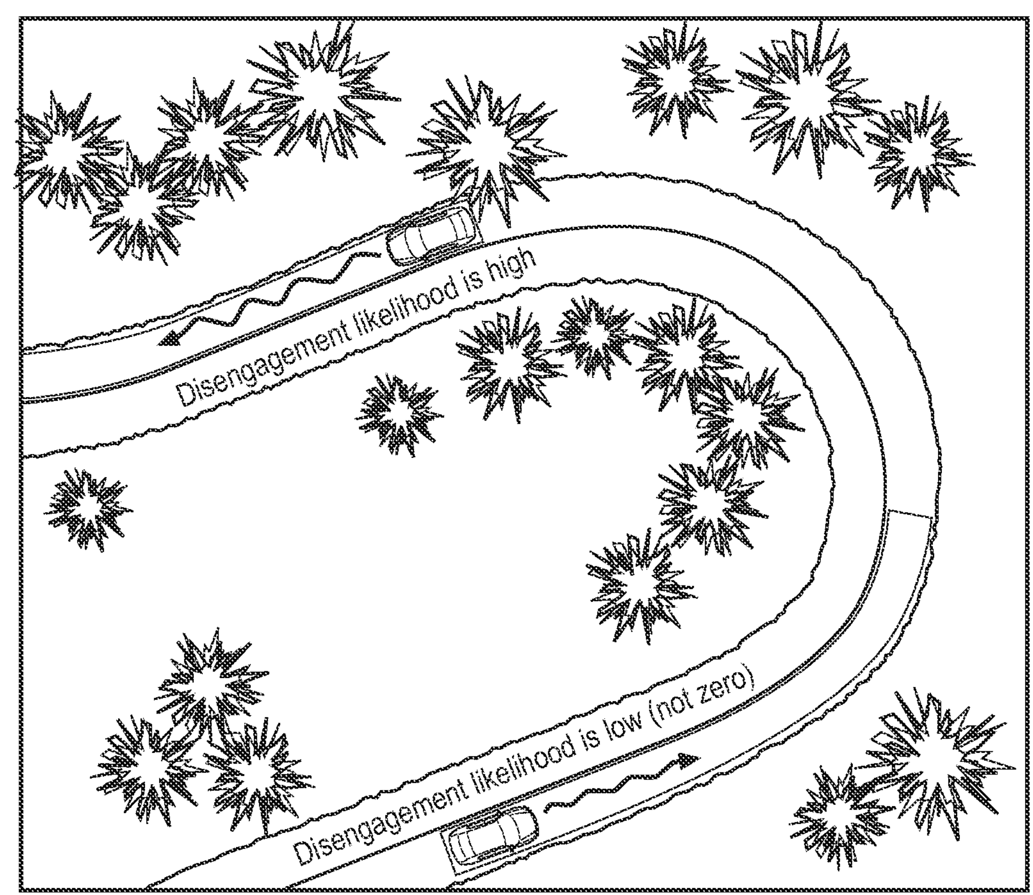
FIG. 8 illustrates one embodiment of a lateral vehicle dynamics stimulus pattern employed for enhancing user vigilance.

The enhancement stimulus module 225 may also generally include instructions that function to control the processor 110 or collection of processors in the cloud-computing environment 300 to select at least one stimulus pattern. For example, based on a potential disengagement event the enhancement stimulus module 225 may select a stimulus pattern such as a sinusoidal waveform that oscillates the front wheels as shown in FIG. 8. As another example, based on information obtained from the potential disengagement event (e.g., risk of handoff in school zone), enhancement stimulus module 225 may select a specific pattern that is allowed under such a condition (e.g., a specific lateral vehicle dynamics stimulus for use in a school zone). As another example, enhancement stimulus module 225 may select a stimulus pattern based on information that results in lower instances of adverse reactions (e.g., based on negative/positive associations recorded in user engagement event data 260) or a greater reduction in operator response time after a disengagement notification. In some embodiments, vehicle operators may be able to select, arrange, or prohibit stimulus patterns generally or for specific contexts, such as through an interactive display or app.

Figure 9:
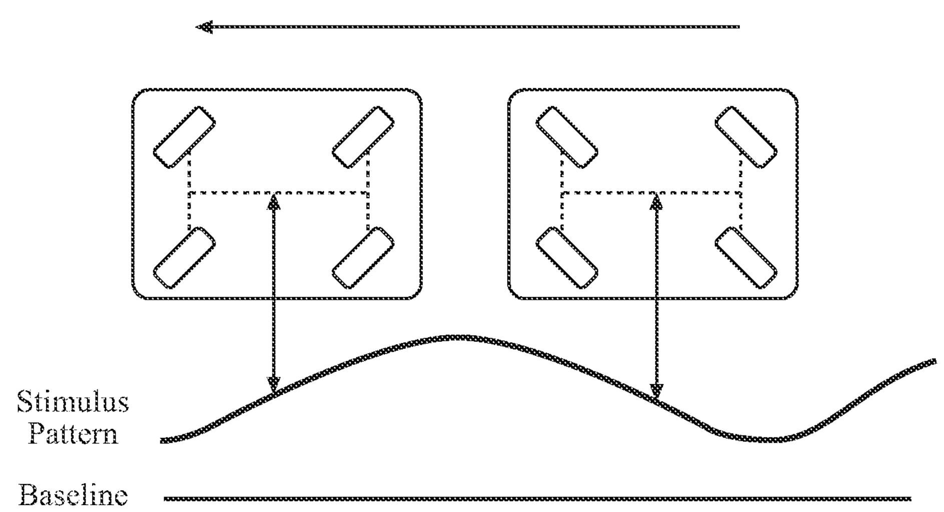
FIG. 9 illustrates another embodiment of a lateral vehicle dynamics stimulus pattern employed for enhancing user vigilance.

The enhancement stimulus module 225 may also generally include instructions that function to control the processor 110 or collection of processors in the cloud-computing environment 300 to execute the at least one stimulus pattern. In one embodiment, the enhancement stimulus module 225 applies the at least one stimulus pattern by carrying out adjustments to one or more wheels relative to a baseline steering signal received from the autonomous driving module. For example, as shown in FIG. 9, enhancement stimulus module 225 may execute one or more stimulus patterns causing vehicle 100 to crabwalk back and forth. In some embodiments, the execution of the stimulus pattern by enhancement stimulus module 225 is terminated if an adverse reaction is detected (e.g., by detection module 220). Alternatively, the termination may only occur if a specific adverse reaction is detected (e.g., operator's hands on steering wheel). The adverse reactions that result in termination of the stimulus pattern may be pre-determined or adjusted over time (e.g., based on negative/positive associations recorded in user engagement event data 260). In some embodiments, a stimulus pattern may contain a set of allowed conditions for termination of such a stimulus pattern with respect to potential adverse reactions. In some embodiments, a stimulus pattern may also include instructions for the desired method of termination for the stimulus pattern (e.g., a ramp function determining the duration and rate of decay for a return to the baselines steering signal).

In some embodiments, even if an adverse reaction is not detected, the enhancement stimulus module 225 may cease executing a stimulus pattern if the likelihood of disengagement for a potential disengagement event exceeds a predetermined threshold. For example, such a pre-determined threshold may be set to the same value as that for issuing a disengagement notification. In some embodiments, the predetermined threshold for a first stimulus pattern may be set lower than that of a second stimulus pattern, such that enhancement stimulus module 225 switches to a more aggressive stimulus pattern prior to an actual disengagement notification. For example, enhancement stimulus module 225 may start with a sinusoidal stimulus pattern when the likelihood of disengagement is 0.5, then switch to a sawtooth stimulus pattern when the likelihood of disengagement is 0.6, and finally terminate the sawtooth stimulus pattern and issue a disengagement notification when the likelihood of disengagement reaches 0.7. In further embodiments where different stimulus patterns are used across a range of likelihood of disengagements, enhancement stimulus module 225 may also interpolate between the stimulus patterns. Thus, with respect to the immediate example provided above, the closer the likelihood of disengagement approaches 0.6 from below, the more the initial sinusoidal stimulus pattern may be adjusted by enhancement stimulus module 225 to take on the characteristics of the sawtooth pattern.

In some embodiments, enhancement stimulus module 225 may use one or more stimulus patterns to target a specific vehicle occupant. For example, a stimulus pattern that only vibrates the front-left wheel of vehicle 100 may be most felt by the driver. In some embodiments, a combination of stimulus patterns may be used such that the disturbance generated by the combined effect of the stimulus patterns is greatest at a specific location in vehicle 100. For example, by adjusting the magnitude, frequency, amplitude, or other characteristics of the stimulus pattern oscillations, enhancement stimulus module 225 may achieve a superposition of vibrational waveforms with maximum net displacement at a specific location. In some embodiments, the superposition process may be adjusted based on information obtained via sensor data 250 to better achieve the targeting effect. In some embodiments, the superposition effect may be adjusted by enhancement stimulus module 225 based on the number and placement of occupants within vehicle 100 or the load detected on or within the vehicle (e.g., via sensor data 250). In some embodiments, enhancement stimulus module 225 may shift the desired targeting process to a different location. For example, if the targeted lateral vehicle dynamics stimulus is determined not to have a sufficient effect on a first occupant (e.g., the driver remains still for 10 seconds), enhancement stimulus module 225 may switch the target location to another location (e.g., the front passenger).

Figure 3:
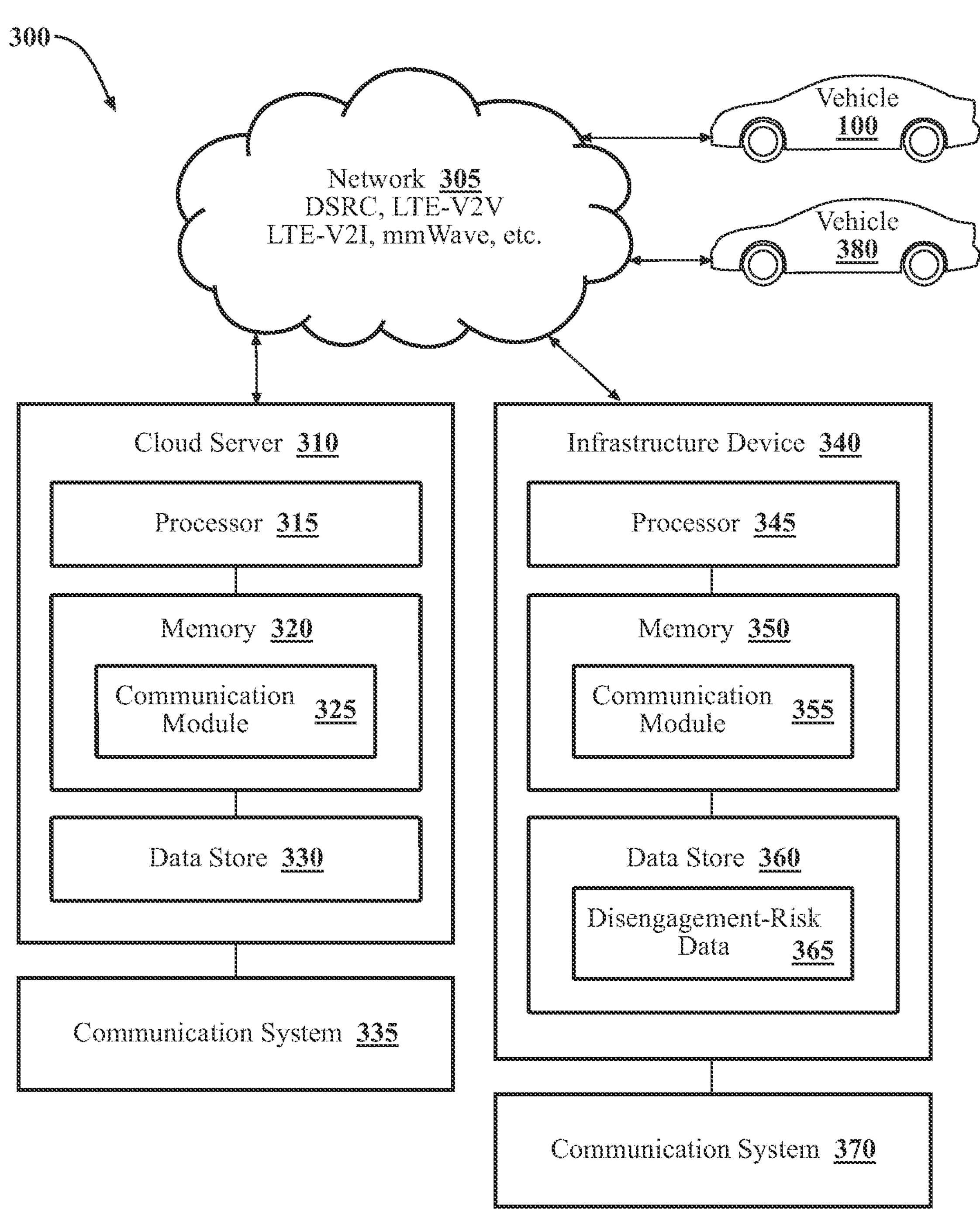
FIG. 3 illustrates one embodiment of a cloud computing environment within which the systems and methods described herein may operate.

In one embodiment, the communication module 230 generally includes instructions that function to control the processor 110 or collection of processors in the cloud-computing environment 300 to collect information potentially affecting an estimated probability of potential disengagement by vehicle 100. For instance. FIG. 3 illustrates one example of a cloud-computing environment 300 that may be implemented along with the vigilance enhancement system 170.

With reference to FIG. 3, vehicle 100 may be connected to a network 305, which allows for communication between vehicle 100 and cloud servers (e.g., cloud server 310), infrastructure devices (e.g., infrastructure device 340), other vehicles (e.g., vehicle 380), and any other systems connected to network 305.

The cloud server 310 is shown as including a processor 315 that may be a part of the vigilance enhancement system 170 through network 305 via communication unit 335. In one embodiment, the cloud server 310 includes a memory 320 that stores a communication module 325. The memory 320 is a random-access memory (RAM), read-only memory (ROM), a hard-disk drive, a flash memory, or other suitable memory for storing the module 325. The module 325 is, for example, computer-readable instructions that when executed by the processor 315 cause the processor 315 to perform the various functions disclosed herein. Moreover, in one embodiment, cloud server 310 includes the database 330. The database 330 is, in one embodiment, an electronic data structure stored in the memory 320 or another data store and that is configured with routines that can be executed by the processor 315 for analyzing stored data, providing stored data, organizing stored data, and so on.

The infrastructure device 340 is shown as including a processor 345 that may be a part of the vigilance enhancement system 170 through network 305 via communication unit 370. In one embodiment, the infrastructure device 340 includes a memory 350 that stores a communication module 355. The memory 350 is a random-access memory (RAM), read-only memory (ROM), a hard-disk drive, a flash memory, or other suitable memory for storing the module 355. The module 355 is, for example, computer-readable instructions that when executed by the processor 345 cause the processor 345 to perform the various functions disclosed herein. Moreover, in one embodiment, infrastructure device 340 includes the database 360. The database 360 is, in one embodiment, an electronic data structure stored in the memory 350 or another data store and that is configured with routines that can be executed by the processor 345 for analyzing stored data, providing stored data, organizing stored data, and so on. In one embodiment, the database 360 includes the disengagement-risk data 365 along with, for example, metadata that characterize various aspects of the disengagement-risk data 365. For example, the metadata can include location coordinates (e.g., longitude and latitude), relative map coordinates or tile identifiers, time/date stamps from when the disengagement-risk data 365 was generated, and so on.

Accordingly, in addition to information obtained from sensor data 250, communication module 230 may obtain disengagement datasets from other vehicles (e.g., from vehicle 380 via network 305), where the disengagement datasets may include information from potential disengagement events and actual disengagement events. In some embodiments, potential disengagement events may not be collected if the likelihood of disengagement associated with the potential disengagement event did not exceed a pre-determined threshold (e.g., 0.5). In some embodiments, the pre-determined threshold for not collecting potential disengagement events may be adjusted based on vehicle parameters (e.g., speed, location), vehicle environment (e.g., highway, construction zone, school zone, sidewalk), or other relevant factors. For example, in higher-risk environments where additional information about lower-probability potential disengagement events are desired, such as a construction or school zone, the pre-determined threshold may be decreased.

In various embodiments, potential or actual disengagement data may include information as to vehicle parameters and vehicle environment at the time the potential disengagement was sufficiently likely to occur (e.g., based on a pre-determined threshold) or when the actual disengagement occurred. In addition, further vehicle parameters and vehicle environment information before and after such points in time may also be included where it is relevant to evaluation of the potential or actual cause of disengagement. In some embodiments, disengagement datasets may include information outside the bounds of a vehicle's parameters or environment information, such as infrastructure-based, satellite-based, or other extrinsic sources of data found to be associated with potential or actual disengagements, such as weather data, emergency information, construction data, traffic data, and so on along or near the path of travel that may be obtained from non-vehicular sources (e.g., from cloud server 310 or infrastructure device 340).

Figure 4:
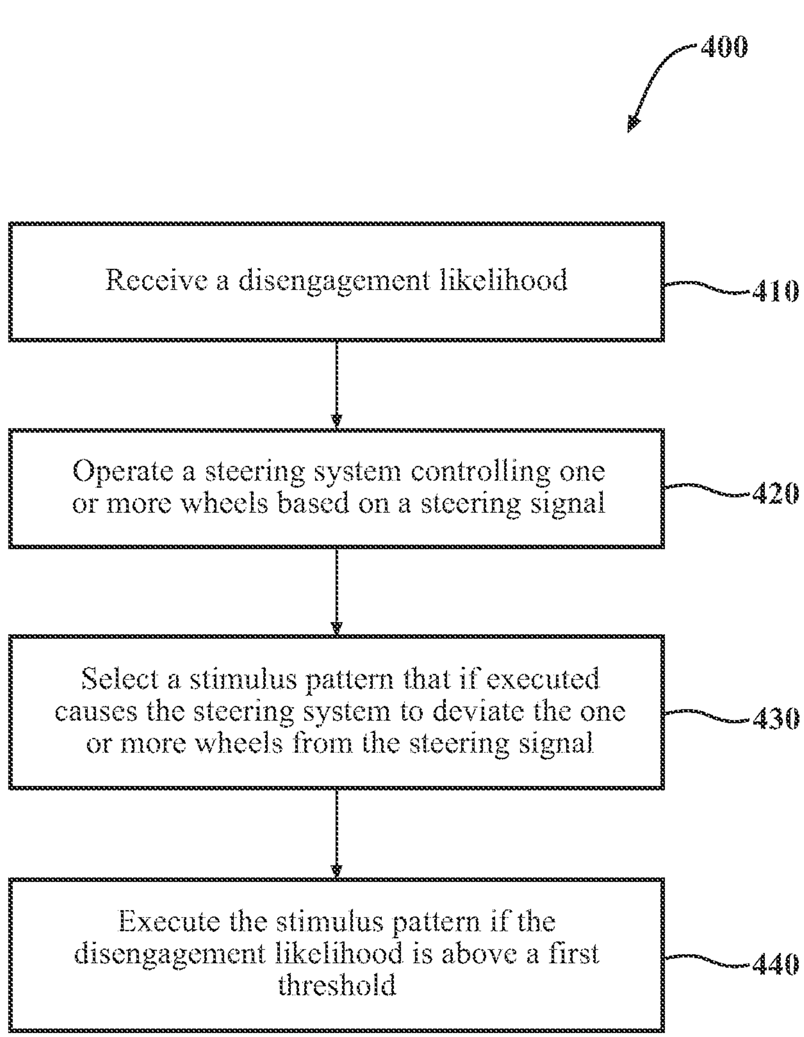
FIG. 4 illustrates one embodiment of a disengagement-risk management method.

Additional aspects of a method for using stimulus patterns to enhance operator vigilance will be discussed in relation to FIG. 4. FIG. 4 illustrates a flowchart of a method 400 that is associated with handling a stimulus pattern with respect to affecting vehicle operation. Method 400 will be discussed from the perspective of the vigilance enhancement system 170 of FIGS. 1 and 2. While method 400 is discussed in combination with the vigilance enhancement system 170 it should be appreciated that the method 400 is not limited to being implemented within the vigilance enhancement system 170 but is instead one example of a system that may implement the method 400.

At 410, enhancement stimulus module 225 may receive a disengagement likelihood. For example, detection module 220 as described with respect to method 500 may determine one or more potential disengagement events for vehicle 100 based on sensor data 250, including any disengagement-risk data contained therein, and an associated disengagement likelihood for each potential disengagement event. Upon completing the determination of a potential disengagement event and a corresponding disengagement likelihood, detection module 220 may then send such information to enhancement stimulus module 225 (e.g., via communication module 230 or sensor data 250).

In some embodiments, enhancement stimulus module 226 may receive the disengagement likelihood associated with a potential disengagement event from an external source, such as an infrastructure device monitoring vehicle 100 or the road.

At 420, enhancement stimulus module 225 may operate a steering system controlling one or more wheels based on a steering signal. For example, a steering signal may be generated from the steering control inputs, such as from autonomous driving module 160. Enhancement stimulus module 225 may then receive the steering signal (e.g., via communication module 230) and apply the steering signal to steering system 143 to control one or more wheels of vehicle 100.

At 430, enhancement stimulus module 225 may select a stimulus pattern that if executed causes the steering system to deviate the one or more wheels from the steering signal. For example, enhancement stimulus module 225 may select a stimulus pattern affecting the wheel closest to the driver. As another example, enhancement stimulus module 225 may select one or more stimulus patterns to be used when specific conditions are met, such as a lateral vehicle dynamics stimulus pattern to be used to indicate high-risk areas (e.g., school zones, construction zones), a lateral vehicle dynamics stimulus pattern to indicate geographic events (e.g., impending arrival at a destination, transition from a limited access road to local roads), a lateral vehicle dynamics stimulus pattern to indicate changes in environmental conditions (e.g., wind, rain, snow), and so on. In this manner, enhancement stimulus module 225 may select lateral vehicle dynamics stimulus patterns that subtly enhance operator vigilance as to a transition that may occur or is occurring. For example, a lateral vehicle dynamics stimulus pattern prior to the vehicle returning home may subtly engage the occupant's attention toward preparing for arrival (e.g., by slightly roughening the ride).

In some embodiments, enhancement stimulus module 225 may select lateral vehicle dynamics stimulus patterns to be used in accordance with information provided to enhancement stimulus module 225, such as a type of lateral vehicle dynamics stimulus requested, vehicle/environment conditions, potential occupant identity and locations, etc. In some embodiments, the selection of one or more lateral vehicle dynamics stimulus patterns may be pre-determined, while in other embodiments the selection of one or more lateral vehicle dynamics stimulus patterns may be adjusted over time. For example, lateral vehicle dynamics stimulus patterns having a high positive association with one or more adverse reactions may be removed from the selection and other lateral vehicle dynamics stimulus patterns having a negative or low positive association selected instead.

In some embodiments, enhancement stimulus module 225 may receive and store lateral vehicle dynamics stimulus patterns in stimulus patterns 270 that alter its selection. For example, enhancement stimulus module 225 may receive revised or new lateral vehicle dynamics stimulus patterns via communication module 230, such as where updates are required or would be beneficial. For example, if any characteristics of vehicle 100 are physically modified or adjusted by software updates, an update of lateral vehicle dynamics stimulus patterns for vehicle 100 may be received by enhancement stimulus module 225 and stored in stimulus patterns 270.

In some embodiments, enhancement stimulus module 225 may receive an external instruction constraining its selection of a lateral vehicle dynamics stimulus pattern. For example, an external instruction may be received from another source, such as infrastructure monitoring vehicle 100 or road, via communications module 230. In some embodiments, an external instruction may specify the lateral vehicle dynamics stimulus pattern to be used. In some embodiments, external instructions may contain information (e.g., the type of lateral vehicle dynamics stimulus required, the occupants to be affected by the lateral vehicle dynamics stimulus) that acts to limit the lateral vehicle dynamics stimulus pattern that may be selected by enhancement stimulus module 225.

At 440, enhancement stimulus module 225 may execute the stimulus pattern if the disengagement likelihood is above a first threshold. For example, enhancement stimulus module 225 may execute a lateral vehicle dynamics stimulus pattern to affect the driver only when a disengagement likelihood associated with a potential disengagement is above 0.5. In some embodiments, enhancement stimulus module 225 may execute the stimulus pattern only if the disengagement likelihood is above a first threshold and below a second threshold (e.g., between 0.5 and 0.7). For example, a first pre-determined threshold may be set at a value substantially lower than where a disengagement warning is given to an operator, while the second pre-determined threshold may be set at or slightly below the value at which a disengagement warning is given.

Moreover, in some embodiments, enhancement stimulus module 225 may execute the stimulus pattern without regard to any measure of operator vigilance, an estimated mental state of the operator, or any estimation of a physical or mental condition regarding an operator or any occupant of a vehicle. For example, information received from user interfaces involving vehicle systems 140, in which such information describes user-implemented changes that affect the operation of one or more enhancement stimuli, may constitute a response demonstrating an adverse reaction. For example, turning off a vehicle function or adjusting a vehicle function affected by a stimulus pattern may constitute an adverse reaction. As a further example, moving the steering wheel or applying pedal inputs may constitute an adverse reaction in response to a lateral vehicle dynamics stimulus.

In some embodiments, a stimulus pattern may contain restriction conditions that prevent enhancement stimulus module 225 from executing a stimulus pattern. For example, a stimulus pattern may have a restriction condition that prohibits its use during certain weather conditions, within or outside geographic areas, within or outside a range of vehicle speeds, and so on. If enhancement stimulus module 225 determines that the restriction condition is satisfied, then enhancement stimulus module 225 may not execute the stimulus pattern. In some embodiments, an override instruction may be sent to enhancement stimulus module 225 to ignore a restriction condition (e.g., in an emergency situation).

In some embodiments, the execution of a stimulus pattern may have no effect on the position of vehicle controls or interfaces relative to that which would have occurred if the stimulus pattern had not been executed. For example, steering system 143 may be implemented with a steer-by-wire steering system, such that any stimulus pattern applied to the wheels by enhancement stimulus module 225 does not affect the steering wheel. For example, a steering wheel configured to follow a baseline steering signal during semi-autonomous or autonomous driving may move as it normally would according to any changes in a baseline steering signal without reflecting any deviations of a stimulus pattern as applied to the wheels. As another example, a steering wheel configured not to move during a semi-autonomous or autonomous mode (e.g., when a steering wheel is in a stowed or retracted position) may continue not to move even in the presence of a stimulus pattern being applied to one or more wheels. In some embodiments, enhancement stimulus module 225 may apply a modification function, such that a stimulus pattern has a different effect on the steering wheel relative to the effect it has on one or more wheels. For example, a steer-by-wire steering system via enhancement stimulus module 225 may apply a stimulus pattern to one or more wheels while reducing the amplitude of the stimulus pattern as applied to the steering wheel.

In some embodiments, enhancement stimulus module 225 may terminate the stimulus pattern if an adverse reaction is detected. For example, enhancement stimulus module 225 may terminate a stimulus pattern due to an adverse event associated with the execution of the stimulus pattern as determined by detection module 220. As another example, enhancement stimulus module 225 may terminate the stimulus pattern because a disengagement warning or takeover request is required. In some embodiments, enhancement stimulus module 225 may terminate a stimulus pattern because enhancement stimulus module 225 determines that a restriction condition has been satisfied by a new change in circumstances of vehicle 100 or its occupants.

Figure 5:
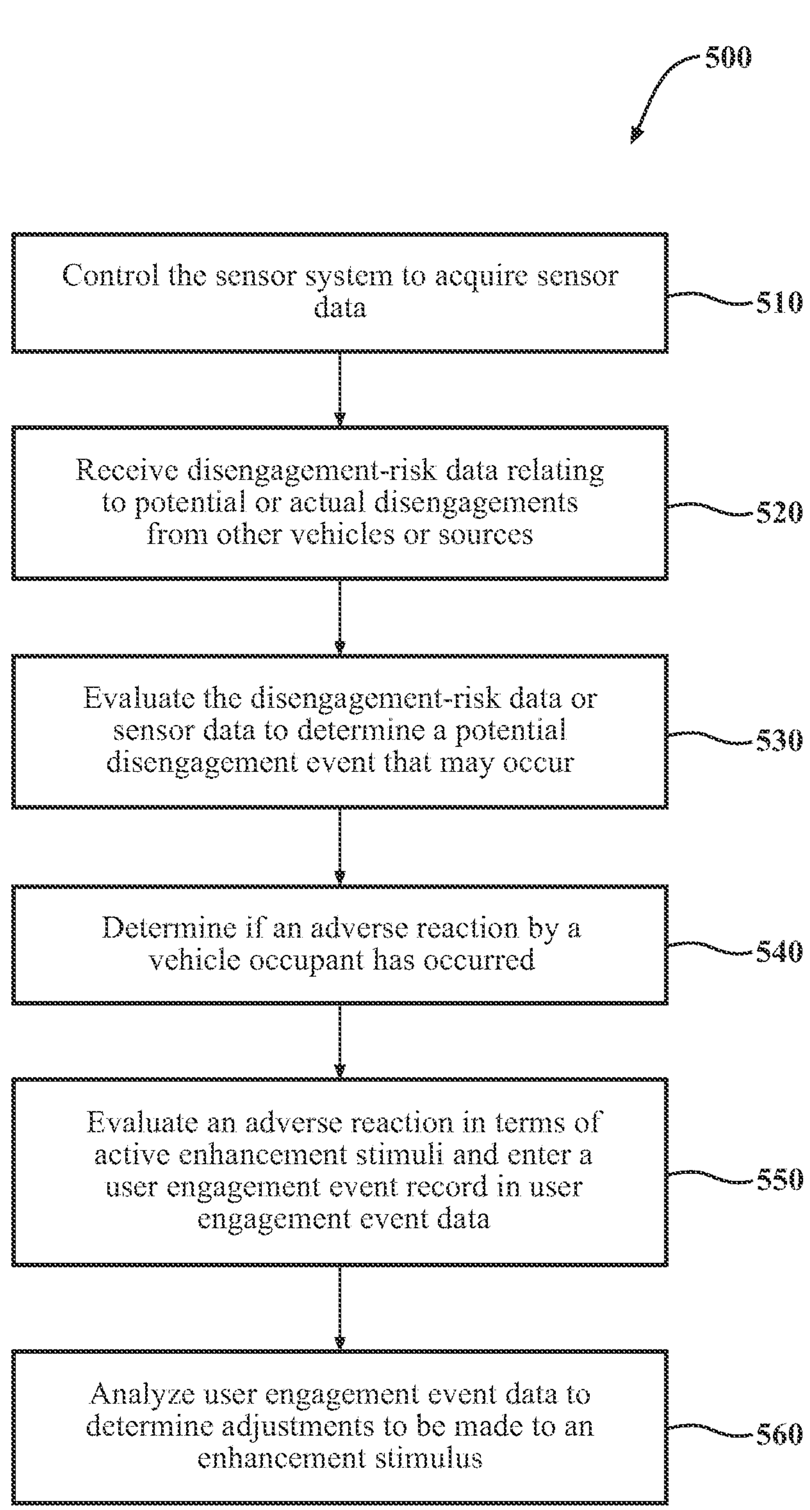
FIG. 5 illustrates one embodiment of a method for detecting potential disengagement events and adverse reactions.

Additional aspects of a method for using stimulus patterns to enhance operator vigilance will be discussed in relation to FIG. 5. FIG. 5 illustrates a flowchart of a method 500 that is associated with detecting potential disengagement events or potential adverse events. Method 500 will be discussed from the perspective of the vigilance enhancement system 170 of FIGS. 1 and 2. While method 500 is discussed in combination with the vigilance enhancement system 170 it should be appreciated that the method 500 is not limited to being implemented within the vigilance enhancement system 170 but is instead one example of a system that may implement the method 500.

At 510, the detection module 220 may control the sensor system 120 to acquire the sensor data 250. In one embodiment, the detection module 220 controls the radar sensor 123 and the camera 126 of the vehicle 100 to observe the surrounding environment. As part of controlling the sensors to acquire the sensor data 250, it is generally understood that the sensors acquire the sensor data 250 of a region around the vehicle 100 with data acquired from different types of sensors generally overlapping in order to provide for a comprehensive sampling of the surrounding environment at each time step. In general, the sensor data 250 need not be of the exact same bounded region in the surrounding environment but should include a sufficient area of overlap such that distinct aspects of the area can be correlated. Thus, the detection module 220, in one embodiment, controls the sensors to acquire the sensor data 250 of the surrounding environment, which may contain disengagement-risk data.

In some embodiments, the detection module 220 may control the sensor system 120 to acquire the sensor data 250 so as to allow for detection of adverse events. In one embodiment, the detection module 220 controls the vehicle sensor(s) 121, the camera 126, and information from user interfaces of vehicle systems 140 to observe the environment of the vehicle occupants. For example, detection module 220 may rely on grip sensors, force sensors, capacitive sensors, EEG, gaze or gesture tracking, control inputs, weight sensors, microphones, or any other measurements that allow for detection of adverse events.

At 520, detection module 220 in some embodiments may receive disengagement-risk data relating to potential or actual disengagements from other vehicles or sources (e.g., a disengagement tracking database associated with a geographic area). Such disengagement-risk data may include any information relating to an increased likelihood of a disengagement or the cause of an actual disengagement, including but not limited to vehicle parameters, vehicle environment information, extrinsic data (e.g., weather, emergency data, traffic data), and so on. In some embodiments, disengagement-risk data may only be collected if the associated likelihood of potential disengagement is above a pre-determined threshold. In further embodiments, the predetermined threshold may be adjusted relative to the context of a potential disengagement (e.g., a lower threshold for higher-risk environments such as intersections, school zones, or unusual adverse weather conditions). In some embodiments, the disengagement-risk data may be stored in sensor data 250.

Moreover, in further embodiments, the detection module 220 controls the sensors to acquire the sensor data 250 at successive iterations or time steps. Thus, the detection module 220, in one embodiment, iteratively executes the functions described at 510 and 520 to acquire the sensor data 250, including any disengagement-risk data, and provide information therefrom. Furthermore, the detection module 220, in one embodiment, executes one or more of the noted functions in parallel for separate observations in order to maintain updated perceptions. Additionally, as previously noted, the detection module 220, when acquiring data from multiple sensors, fuses the data together to form the sensor data 250 and to provide for improved determinations of detection, location, and so on.

At 530, the detection module 220 may evaluate the disengagement-risk data or sensor data 250 as a whole to determine a potential disengagement event that may occur for vehicle 100. For example, based on similarities or dissimilarities with an event in the disengagement-risk data, detection module 220 may determine that a potential disengagement event exists. For example, if a vehicle previously in similar circumstances to vehicle 100 determined a risk of potential disengagement or encountered an actual disengagement, detection module 220 may determine that a potential disengagement event exists.

For each potential disengagement event determined by detection module 220, detection module 220 may also determine a likelihood of disengagement associated with the potential disengagement event. For example, detection module 220 may determine on approaching an intersection that a first potential disengagement event with a probability of 0.5 exists and that immediately after the intersection a second potential disengagement event on a highway on-ramp with a probability of 0.3 exists.

At 540, the detection module 220 may determine if an adverse reaction by a vehicle occupant has occurred. An adverse reaction may include any detectable action by an occupant of a vehicle that may be interpreted as a response to an enhancement stimulus. For example, an adverse reaction may include interacting with a steering wheel, an interactive screen, gas or brake pedals, seat controls, dashboard controls, or any other vehicle user interface that may be interpreted as indicating a user response to an enhancement stimulus. In some embodiments, a response may only be designated as an adverse reaction if it satisfies criteria established for an enhancement stimulus. For example, a massage stimulus pattern may limit adverse reactions to responses by a vehicle occupant that only affects the massage system. In addition, time constraints may be employed in some embodiments to determine whether a response is an adverse reaction. For example, a response may need to occur within a time frame after a change is made to an enhancement stimulus (e.g., a change in intensity or frequency). In some embodiments, detection module 220 may determine that a response is not an adverse reaction due to an intervening notification or warning to an occupant (e.g., disengagement warning, takeover request, text message, phone call, low battery warning). In some embodiments, detection module 220 may determine that a response is not an adverse reaction due to changes in the environment surrounding the vehicle (e.g., horn honk, headlight flash, tire squeal, rain). In some embodiments, detection module 220 may determine that a response is not an adverse reaction due to action undertaken by another occupant (e.g., changing radio volume, lowering a window, speaking to, or touching another occupant).

At 550, detection module 220 may evaluate an adverse reaction in terms of active enhancement stimuli and enter a user engagement event record in user engagement event data 260. As shown in FIG. 6, a user engagement event record stored within user engagement event data 260 may contain information relating to the type of adverse reaction, the intensity of the adverse reaction, the occupant responsible for the adverse reaction, the enhancement stimuli in effect when the adverse reaction was detected (e.g., based on vehicle systems being affected by stimulus patterns executed by enhancement stimulus module 225), any positive association determined between the adverse reaction and an enhancement stimulus, any negative association determined between the adverse reaction and an enhancement stimulus, and any restriction conditions in effect on an enhancement stimulus in operation.

In determining whether an enhancement stimulus has a positive or negative association with an adverse reaction, detection module 220 may evaluate the adverse reaction with respect to any changes in intensity, frequency, or other characteristics of the enhancement stimulus. For example, an enhancement stimulus may have a higher positive association the more recently a change with regard to the stimulus occurred before the occurrence of the adverse reaction. In addition, any enhancement stimulus that did not change after a pre-determined threshold prior to the adverse reaction may be accorded a negative association, the value of which may increase the further in past such a change occurred relative to the pre-determined threshold. In some embodiments, the type and intensity of the adverse reaction may be evaluated in order to determine the magnitude of a positive or negative association with an adverse reaction. For example, an adverse reaction involving massage controls may be more positively associated with a massage stimulus, while negatively associated with a temperature-based stimulus. As another example, the intensity with which an occupant engages the steering wheel or pedal inputs in an adverse reaction to a seat position/incline-based enhancement stimulus may determine the magnitude of the positive association of the adverse reaction to the seat position/incline-based enhancement stimulus.

At 560, detection module 220 may analyze user engagement event data 260 to determine adjustments to be made to an enhancement stimulus. For example, if user engagement event data 260 indicates strong or frequent positive associations with adverse events to a massage-based enhancement stimulus, detection module 220 may accordingly adjust the characteristics of the stimulus pattern being used or set a restriction condition within the stimulus pattern. For example, detection module 220 may instruct that a stimulus pattern in stimulus patterns 270 be scaled down in terms of magnitude, adjusted in terms of frequency or scaled down with respect to other characteristics. In some embodiments, such a process may repeat until the frequency or intensity of positive associations of an enhancement stimulus with respect to adverse events satisfies a pre-determined threshold. In some embodiments, detection module 220 may alternatively scale up a stimulus pattern in terms of magnitude or other characteristics if the frequency or intensity of positive associations of an enhancement stimulus with respect to adverse events is well below a pre-determined threshold. In further embodiments, such scaling up may only occur for a stimulus pattern if the frequency or intensity of negative associations with respect to adverse events is above a pre-determined threshold. In some embodiments, detection module 220 may set a restriction condition that prohibits the operation of a stimulus pattern, such as where scaling or other adjustments to a stimulus pattern does not adequately reduce the frequency or intensity of positive associations of the stimulus pattern with respect to adverse reactions (e.g., below a pre-determined threshold).

Figure 7:
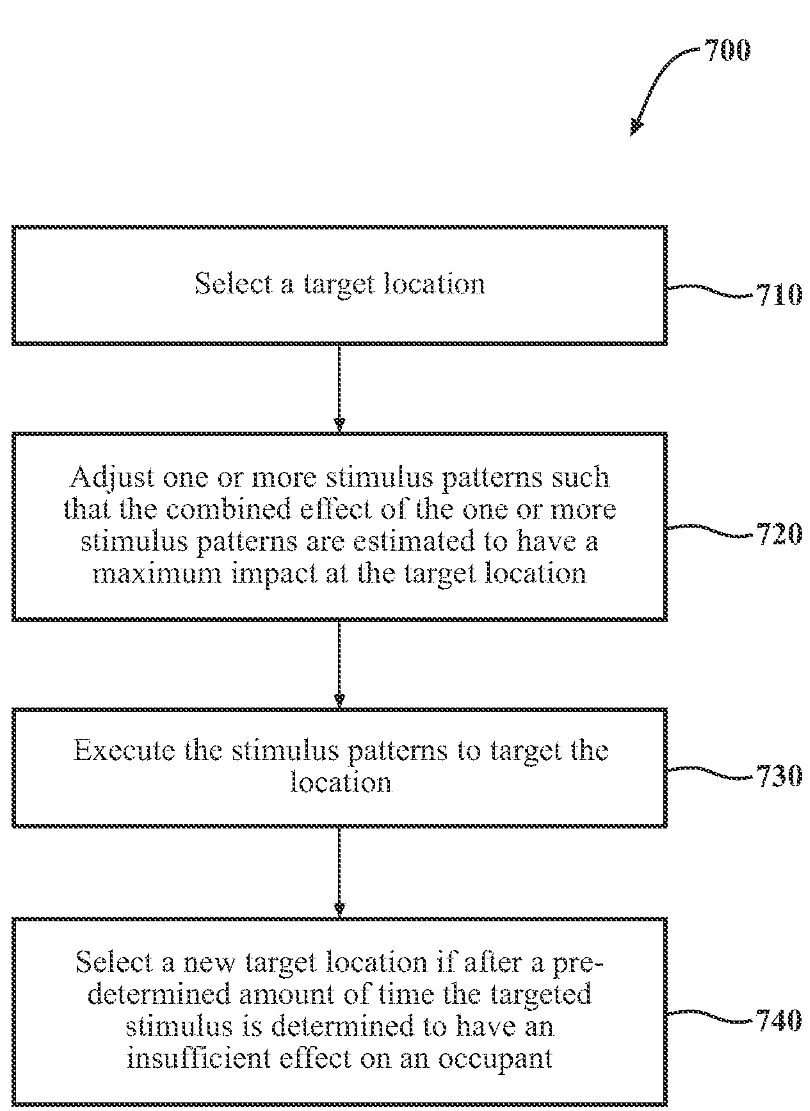
FIG. 7 illustrates one embodiment of a method for targeting a user through an enhancement stimulus.

Additional aspects of a method for using stimulus patterns to enhance operator vigilance will be discussed in relation to FIG. 7. FIG. 7 illustrates a flowchart of a method 700 that is associated with targeting a stimulus pattern with respect to an enhancement stimulus. Method 700 will be discussed from the perspective of the vigilance enhancement system 170 of FIGS. 1 and 2. While method 700 is discussed in combination with the vigilance enhancement system 170 it should be appreciated that the method 700 is not limited to being implemented within the vigilance enhancement system 170 but is instead one example of a system that may implement the method 700.

At 710, enhancement stimulus module 225 may select a target location. For example, enhancement stimulus module 225 may select an area associated with a driver's seat, a front passenger seat, or a rear passenger seat. In some embodiments, the occupant may be selected (e.g., driver, front passenger) as a proxy for a target location.

At 720, enhancement stimulus module 225 may adjust one or more stimulus patterns such that the combined effect of the one or more stimulus patterns (e.g., the superposition of vibrational waves caused by the one or more stimulus patterns affecting the steering system) are estimated to have a maximum impact at the target location. In adjusting the one or more stimulus patterns, enhancement stimulus module 225 may take into account information regarding characteristics of the vehicle that may affect an estimate of maximum impact.

At 730, enhancement stimulus module 225 may execute the stimulus patterns to target the location. In some embodiments, enhancement stimulus module 225 may further adjust the one or more stimulus patterns based on sensor data 250 to obtain a better estimate of where the maximum impact of the stimulus patterns is occurring.

At 740, enhancement stimulus module 225 may select a new target location if after a pre-determined amount of time the targeted stimulus is determined to have an insufficient effect on an occupant.

FIG. 1 will now be discussed in full detail as an example environment within which the system and methods disclosed herein may operate. In some instances, the vehicle 100 is configured to switch selectively between an autonomous mode, one or more semi-autonomous operational modes, or a manual mode. Such switching can be implemented in a suitable manner, now known, or later developed. "Manual mode" means that all of or a majority of the navigation or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein. "autonomous vehicle" refers to a vehicle that operates in an autonomous mode. "Autonomous mode" refers to navigating or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation or maneuvering of the vehicle along a travel route, and a vehicle operator (i.e., driver) provides inputs to the vehicle to perform a portion of the navigation or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile or non-volatile memory. Examples of suitable data stores 115 include RAM (Random Access Memory), flash memory, ROM (Read Only Memory). PROM (Programmable Read-Only Memory). EPROM (Erasable Programmable Read-Only Memory). EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, or information for one or more items included in the map data 116 or relative to other items included in the map data 116. The map data 116 can include a digital map with information about road geometry. The map data 116 can be high quality or highly detailed.

In one or more arrangements, the map data 116 can include one or more terrain maps 117. The terrain map(s) 117 can include information about the ground, terrain, roads, surfaces, or other features of one or more geographic areas. The terrain map(s) 117 can include elevation data in the one or more geographic areas. The map data 116 can be high quality or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, or other data associated with it. The static obstacle map(s) 118 can include measurements, dimensions, distances, or information for one or more static obstacles. The static obstacle map(s) 118 can be high quality or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 or the sensor data 119 can be located in one or more data stores 115 located onboard the vehicle 100. Alternatively, or in addition, at least a portion of the map data 116 or the sensor data 119 can be located in one or more data stores 115 that are located remotely from the vehicle 100.

As noted above, the vehicle 100 can include the sensor system 120. The sensor system 120 can include one or more sensors. "Sensor" means any device, component or system that can detect, or sense something. The one or more sensors can be configured to detect, or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 or the one or more sensors can be operatively connected to the processor(s) 110, the data store(s) 115, or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, or sense information about the vehicle 100 itself. In one or more arrangements, the vehicle sensor(s) 121 can be configured to detect, or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, or sense driving environment data. "Driving environment data" includes data or information about the external environment in which an autonomous vehicle is located or one or more portions thereof. For example, the one or more environment sensors 122 can be configured to detect, quantify, or sense obstacles in at least a portion of the external environment of the vehicle 100 or information/data about such obstacles. Such obstacles may be stationary objects or dynamic objects. The one or more environment sensors 122 can be configured to detect, measure, quantify or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware or software within the vehicle 100. The vehicle 100 can include a propulsion system 141, a braking system 142, a steering system 143, throttle system 144, a transmission system 145, a signaling system 146, or a navigation system 147. Each of these systems can include one or more devices, components, or a combination thereof, now known or later developed.

The navigation system 147 can include one or more devices, applications, or combinations thereof, now known or later developed, configured to determine the geographic location of the vehicle 100 or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the vigilance enhancement system 170, or the automated driving module(s) 160 can be operatively connected to communicate with the various vehicle systems 140 or individual components thereof. For example, returning to FIG. 1, the processor(s) 110 or the automated driving module(s) 160 can be in communication to send or receive information from the various vehicle systems 140 to control the movement, speed, maneuvering, heading, direction, etc. of the vehicle 100. The processor(s) 110, the vigilance enhancement system 170, or the automated driving module(s) 160 may control some or all of these vehicle systems 140 and, thus, may be partially or fully autonomous.

The processor(s) 110, vigilance enhancement system 170, or the automated driving module(s) 160 can be operatively connected to communicate with the various vehicle systems 140 or individual components thereof. For example, returning to FIG. 1, the processor(s) 110, the vigilance enhancement system 170, or the automated driving module(s) 160 can be in communication to send or receive information from the various vehicle systems 140 to control the movement, speed, maneuvering, heading, direction, etc. of the vehicle 100. The processor(s) 110, the vigilance enhancement system 170, or the automated driving module(s) 160 may control some or all of these vehicle systems 140.

The processor(s) 110, the vigilance enhancement system 170, or the automated driving module(s) 160 may be operable to control the navigation or maneuvering of the vehicle 100 by controlling one or more of the vehicle systems 140 or components thereof. For instance, when operating in an autonomous mode, the processor(s) 110, the vigilance enhancement system 170, or the automated driving module(s) 160 can control the direction or speed of the vehicle 100. The processor(s) 110, the vigilance enhancement system 170, or the automated driving module(s) 160 can cause the vehicle 100 to accelerate (e.g., by increasing the supply of fuel provided to the engine), decelerate (e.g., by decreasing the supply of fuel to the engine or by applying brakes) or change direction (e.g., by turning the front two wheels). As used herein. "cause" or "causing" means to make, force, compel, direct, command, instruct, or enable an event or action to occur or at least be in a state where such event or action may occur, either in a direct or indirect manner.

The vehicle 100 can include one or more actuators 150. The actuators 150 can be any element or combination of elements operable to modify, adjust or alter one or more of the vehicle systems 140 or components thereof to responsive to receiving signals or other inputs from the processor(s) 110 or the automated driving module(s) 160. Any suitable actuator can be used. For instance, the one or more actuators 150 can include motors, pneumatic actuators, hydraulic pistons, relays, solenoids, or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The automated driving module(s) 160 can be configured to receive data from the sensor system 120 or any other type of system capable of capturing information relating to the vehicle 100 or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, or determine location information for obstacles within the external environment of the vehicle 100 for use by the processor(s) 110, or one or more of the modules described herein to estimate position and orientation of the vehicle 100, vehicle position in global coordinates based on signals from a plurality of satellites, or any other data or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the vigilance enhancement system 170 can be configured to determine travel path(s), current autonomous driving maneuvers for the vehicle 100, future autonomous driving maneuvers or modifications to current autonomous driving maneuvers based on data acquired by the sensor system 120, driving scene models, or data from any other suitable source such as determinations from the sensor data 250. In general, the automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, or reversing, just to name a few possibilities. The automated driving module(s) 160 can be configured can be configured to implement determined driving maneuvers. The automated driving module(s) 160 can cause, directly or indirectly, such autonomous driving maneuvers to be implemented. As used herein, "cause" or "causing" means to make, command, instruct, or enable an event or action to occur or at least be in a state where such event or action may occur, either in a direct or indirect manner. The automated driving module(s) 160 can be configured to execute various vehicle functions or to transmit data to, receive data from, interact with, or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for a vehicle, comprising:

a processor; and a memory storing machine-readable instructions that, when executed by the processor, cause the processor to:

receive a disengagement likelihood of an autonomous vehicle function;

operate a steering system controlling one or more wheels based on a steering signal;

select a stimulus pattern that if executed causes the steering system to deviate the one or more wheels from the steering signal; and execute the stimulus pattern based on the disengagement likelihood being above a first threshold.

2. The system of claim 1, wherein the machine-readable instructions further include an instruction that, when executed by the processor, causes the processor to:

alter how the stimulus pattern deviates the one or more wheels from the steering signal if the disengagement likelihood changes.

3. The system of claim 2, wherein the stimulus pattern if executed does not cause a steering input interface to deviate during the execution of the stimulus pattern.

4. The system of claim 3, wherein the machine-readable instructions further include an instruction that, when executed by the processor, cause the processor to:

determine whether an adverse reaction has occurred prior to a disengagement warning; and terminate the execution of the stimulus pattern if an adverse reaction is detected.

5. The system of claim 4, wherein the adverse reaction can only have occurred if a response satisfies a relationship condition specified in the stimulus pattern.

6. The system of claim 5, wherein to execute the stimulus pattern further requires that the disengagement likelihood is below a second threshold specifying when to provide a disengagement warning.

7. The system of claim 6, wherein the machine-readable instructions further include an instruction that, when executed by the processor, causes the processor to:

prohibit the execution of the stimulus pattern if a restriction condition exists.

8. The system of claim 7, wherein the machine-readable instructions further include an instruction that, when executed by the processor, causes the processor to:

adjust the stimulus pattern with respect to a vehicle occupant location.

9. A non-transitory computer-readable medium including instructions that when executed by a processor cause the processor to:

receive a disengagement likelihood of an autonomous vehicle function;

operate a steering system controlling one or more wheels based on a steering signal;

select a stimulus pattern that if executed causes the steering system to deviate the one or more wheels from the steering signal; and execute the stimulus pattern based on the disengagement likelihood being above a first threshold.

10. The non-transitory computer-readable medium of claim 9, wherein the instructions further includes an instruction that, when executed by the processor, causes the processor to:

alter how the stimulus pattern deviates the one or more wheels from the steering signal if the disengagement likelihood changes.

11. The non-transitory computer-readable medium of claim 10, wherein the stimulus pattern if executed does not cause a steering input interface to deviate during the execution of the stimulus pattern.

12. The non-transitory computer-readable medium of claim 11, wherein the instructions further includes an instruction that, when executed by the processor, causes the processor to:

determine whether an adverse reaction has occurred prior to a disengagement warning; and terminate the execution of the stimulus pattern if an adverse reaction is detected.

13. The non-transitory computer-readable medium of claim 12, wherein the adverse reaction can only have occurred if a response satisfies a relationship condition specified in the stimulus pattern.

14. A method for enhancing operator vigilance, the method comprising:

receiving a disengagement likelihood of an autonomous vehicle function;

operating a steering system controlling one or more wheels based on a steering signal;

selecting a stimulus pattern that if executed causes the steering system to deviate the one or more wheels from the steering signal; and executing the stimulus pattern based on the disengagement likelihood being above a first threshold.

15. The method of claim 14, further comprising:

altering how the stimulus pattern deviates the one or more wheels from the steering signal if the disengagement likelihood changes.

16. The method of claim 15, wherein the stimulus pattern if executed does not cause a steering input interface to deviate during the execution of the stimulus pattern.

17. The method of claim 16, further comprising:

determining whether an adverse reaction has occurred prior to a disengagement warning; and terminating the execution of the stimulus pattern if an adverse reaction is detected.

18. The method of claim 17, wherein the adverse reaction can only have occurred if a response satisfies a relationship condition specified in the stimulus pattern.

19. The method of claim 18, further comprising:

prohibiting the execution of the stimulus pattern if a restriction condition exists.

20. The method of claim 19, further comprising:

adjusting the stimulus pattern with respect to a vehicle occupant location.

* * * * *